(12) United States Patent
Calian et al.

(10) Patent No.: US 12,254,678 B2
(45) Date of Patent: Mar. 18, 2025

(54) TRAINING A NEURAL NETWORK USING OUTPUTS OF A CORRUPTION NEURAL NETWORK

(71) Applicant: DeepMind Technologies Limited, London (GB)

(72) Inventors: Dan-Andrei Calian, London (GB); Sven Adrian Gowal, Cambridge (GB); Timothy Arthur Mann, Harpenden (GB); András György, London (GB)

(73) Assignee: DeepMind Technologies Limited, London (GB)

( * ) Notice: Subject to any disclaimer, the term of this patent is extended or adjusted under 35 U.S.C. 154(b) by 306 days.

(21) Appl. No.: 17/711,951

(22) Filed: Apr. 1, 2022

(65) Prior Publication Data

US 2023/0316729 A1    Oct. 5, 2023

(51) Int. Cl.
*G06V 10/774*    (2022.01)
*G06V 10/776*    (2022.01)
*G06V 10/82*    (2022.01)

(52) U.S. Cl.
CPC ........ *G06V 10/7747* (2022.01); *G06V 10/776* (2022.01); *G06V 10/82* (2022.01)

(58) Field of Classification Search
CPC ... G06V 10/7747; G06V 10/776; G06V 10/82
See application file for complete search history.

(56) References Cited

U.S. PATENT DOCUMENTS

2022/0108132 A1*    4/2022    Zhang ................ G06F 18/2148

OTHER PUBLICATIONS

Arjovsky et al., "Invariant risk minimization," CoRR, Jul. 5, 2019, arXiv:1907.02893, 31 pages.
Baluja et al., "Adversarial transformation networks: Learning to generate adversarial examples," CoRR, Mar. 28, 2017, arXiv:1703.09387, 13 pages.
Carlini et al., "Adversarial examples are not easily detected: Bypassing ten detection methods," Proceedings of the 10th ACM Workshop on Artificial Intelligence and Security, Nov. 3, 2017, pp. 3-14.

(Continued)

*Primary Examiner* — Casey L Kretzer
(74) *Attorney, Agent, or Firm* — Fish & Richardson P.C.

(57) ABSTRACT

Methods, systems, and apparatus, including computer programs encoded on computer storage media for processing a network input using a trained neural network with network parameters to generate an output for a machine learning task. The training includes: receiving a set of training examples each including a training network input and a reference output; for each training iteration, generating a corrupted network input for each training network input using a corruption neural network; updating perturbation parameters of the corruption neural network using a first objective function based on the corrupted network inputs; generating an updated corrupted network input for each training network input based on the updated perturbation parameters; and generating a network output for each updated corrupted network input using the neural network; for each training example, updating the network parameters using a second objective function based on the network output and the reference output.

20 Claims, 6 Drawing Sheets

(56) References Cited

OTHER PUBLICATIONS

Carlini et al., "Towards evaluating the robustness of neural networks," 2017 IEEE Symposium on Security and Privacy, 2017, 19 pages.
Chen et al., "End to end learning for self-driving cars," 2017 IEEE Intelligent Vehicles Symposium (IV), Jun. 11-14, 2017, pp. 1856-1860.
Covington et al., "Deep neural networks for YouTube recommendations," Proceedings of the 10th ACM Conference on Recommender Systems, Sep. 2016, pp. 191-198.
Croce et al., "Robustbench: a standardized adversarial robustness benchmark," CoRR, Oct. 19, 2020, arxiv.org/abs/2010.09670, 29 pages.
Cubuk et al., "Autoaugment: Learning augmentation policies from data," CoRR, May 24, 2018, arxiv.org/abs/1805.09501, 14 pages.
Cubuk et al., "Randaugment: Practical automated data augmentation with a reduced search space," Proceedings of the IEEE/CVF Conference on Computer Vision and Pattern Recognition (CVPR) Workshops, 2020, 10 pages.
De Fauw et al., "Clinically applicable deep learning for diagnosis and referral in retinal disease," Nature Medicine, Aug. 13, 2018, 24(9):1342-1350.
Devries et al., "Improved regularization of convolutional neural networks with cutout," CoRR, Aug. 15, 2017, arXiv:1708.04552, 8 pages.
Foret et al., "Sharpness-aware minimization for efficiently improving generalization," CoRR, Oct. 3, 2020, arxiv.org/abs/2010.01412, 20 pages.
Geirhos et al., "Generalisation in humans and deep neural networks," Advances in Neural Information Processing Systems 31 (NeurIPS 2018), 2018, 13 pages.
Geirhos et al., "Imagenet-trained cnns are biased towards texture; increasing shape bias improves accuracy and robustness," CoRR, Nov. 29, 2018, arxiv.org/abs/1811.12231, 22 pages.
Goodfellow et al., "Explaining and harnessing adversarial examples," CoRR, Dec. 20, 2014, arxiv.org/abs/1412.6572, 11 pages.
Gowal et al., "Achieving Robustness in the Wild via Adversarial Mixing with Disentangled Representations," Proceedings of the IEEE/CVF Conference on Computer Vision and Pattern Recognition (CVPR), 2020, pp. 1211-1220.
Gowal et al., "Uncovering the limits of adversarial training against norm-bounded adversarial examples," CoRR, Oct. 7, 2020, arXiv:2010.03593, 33 pages.
Goyal et al., "Accurate, large minibatch sgd: Training imagenet in 1 hour," CoRR, Jun. 8, 2017, arXiv:1706.02677, 12 pages.
Guo et al., "Mixup as locally linear out-of-manifold regularization," Proceedings of the AAAI Conference on Artificial Intelligence, Jul. 17, 2019, 33(1):3714-3722.
Hameed et al., "Perceptually constrained adversarial attacks," CoRR, Feb. 14, 2021, arxiv.org/abs/2102.07140, 17 pages.
Hameed, "New quality measures for adversarial attacks with applications to secure communication," Thesis for the degree of Doctor of Philosophy, Imperial College of Science, Technology and Medicine, Jul. 2020, 103 pages.
He et al., "Deep residual learning for image recognition," Proceedings of the IEEE Conference on Computer Vision and Pattern Recognition (CVPR), 2016, pp. 770-778.
He et al., "Identity mappings in deep residual networks," European Conference on Computer Vision, Sep. 17, 2016, pp. 630-645.
Hendrycks et al., "Augmix: A simple data processing method to improve robustness and uncertainty," CoRR, Dec. 5, 2019, arxiv.org/abs/1912.02781, 15 pages.
Hendrycks et al., "Benchmarking neural network robustness to common corruptions and perturbations," CoRR, Mar. 28, 2019, arxiv.org/abs/1903.12261, 16 pages.
Hendrycks et al., "Natural adversarial examples," Proceedings of the IEEE/CVF Conference on Computer Vision and Pattern Recognition (CVPR), 2021, pp. 15262-15271.
Hendrycks et al., "The Many Faces of Robustness: A Critical Analysis of Out-of-Distribution Generalization," Proceedings of the IEEE/CVF International Conference on Computer Vision (ICCV), 2021, pp. 8340-8349.
Hinton et al., "Deep neural networks for acoustic modeling in speech recognition: The shared views of four research groups," IEEE Signal processing magazine, Nov. 2012, 29(6):82-97.
Jaderberg et al., "Spatial transformer networks," Advances in Neural Information Processing Systems 28, 2015, 9 pages.
Kingma et al., "Adam: A method for stochastic optimization," CoRR, Dec. 22, 2014, arXiv:1412.6980, 15 pages.
Kireev et al., "On the effectiveness of adversarial training against common corruptions," Proceedings of the Thirty-Eighth Conference on Uncertainty in Artificial Intelligence, 2022, 180:1012-1021.
Krizhevsky et al., "Imagenet classification with deep convolutional neural networks," In Adv. Neural Inform. Process. Syst. 25, 2012, 9 pages.
Kuehlkamp et al., "Gender-from-iris or gender-from-mascara?," 2017 IEEE Winter Conference on Applications of Computer Vision (WACV), Mar. 24-31, 2017, pp. 1151-1159.
Kurakin et al., "Adversarial examples in the physical world," CoRR, Jul. 8, 2016, arxiv.org/abs/1607.02533, 14 pages.
Laidlaw et al., "Perceptual adversarial robustness: Defense against unseen threat models," International Conference on Learning Representations, 2021, 25 pages.
Lee et al., "Compounding the performance improvements of assembled techniques in a convolutional neural network," CoRR, Jan. 17, 2020, arxiv.org/abs/2001.06268, 12 pages.
Lim et al., "Enhanced deep residual networks for single image super-resolution," Proceedings of the IEEE Conference on Computer Vision and Pattern Recognition (CVPR), 2017, pp. 136-144.
Lopes et al., "Improving robustness without sacrificing accuracy with patch Gaussian augmentation," CoRR, Jun. 6, 2019, arXiv:1906.02611, 18 pages.
Loshchilov et al., "SGDR: stochastic gradient descent with warm restarts," CoRR, Aug. 13, 2016, arxiv.org/abs/1608.03983, 16 pages.
Madry et al., "Towards deep learning models resistant to adversarial attacks," Int. Conf. Learn. Represent., 2018, 23 pages.
Nesterov, "A method of solving a convex programming problem with convergence rate o(1/k2)," Doklady Akademii Nauk SSSR, 1983, 269(3):543-547 (with English abstract).
Neyshabur et al., "Exploring generalization in deep learning," Advances in Neural Information Processing Systems, 2017, 10 pages.
Papernot et al., "Distillation as a defense to adversarial perturbations against deep neural networks," IEEE Symposium on Security and Privacy, Mar. 14, 2016, 16 pages.
Polyak, "Some methods of speeding up the convergence of iteration methods," USSR Computational Mathematics and Mathematical Physics, Nov. 26, 1962, 4(5):1-17.
Qin et al., "Adversarial Robustness through Local Linearization," CoRR, Jul. 4, 2019, arxiv.org/abs/1907.02610, 17 pages.
Qiu et al., "SemanticAdv: Generating Adversarial Examples via Attribute-conditional Image Editing," CoRR, Jul. 2, 2020, arXiv:1906.07927v4, 33 pages.
Raghunathan et al., "Adversarial training can hurt generalization," ICML 2019 Workshop on Identifying and Understanding Deep Learning Phenomena, 2019, 11 pages.
Recht et al., "Do ImageNet Classifiers Generalize to ImageNet?," Proceedings of the 36th International Conference on Machine Learning, 2019, 97:5389-5400.
Rice et al., "Overfitting in adversarially robust deep learning," roceedings of the 37th International Conference on Machine Learning, 2020, 119:8093-8104.
Richardson et al., "The surprising effectiveness of linear unsupervised image-to-image translation," 2020 25th International Conference on Pattern Recognition (ICPR), Jan. 10-15, 2021, pp. 7855-7861.
Ronneberger et al., "U-net: Convolutional networks for biomedical image segmentation," Medical Image Computing and Computer-Assisted Intervention—MICCAI 2015: 18th International Conference, Oct. 5-9, 2015, 8 pages.

(56) References Cited

OTHER PUBLICATIONS

Rusak et al., "A simple way to make neural networks robust against diverse image corruptions," CoRR, Jan. 16, 2020, arxiv.org/abs/2001.06057, 34 pages.
Seyed-Mohsen et al., "Robustness via curvature regularization, and vice versa," Proceedings of the IEEE/CVF Conference on Computer Vision and Pattern Recognition (CVPR), 2019, pp. 9078-9086.
Song et al., "Constructing unrestricted adversarial examples with generative models," Advances in Neural Information Processing Systems 31, 2018, 12 pages.
Sugiyama et al., "Covariate shift adaptation by importance weighted cross validation," Journal of Machine Learning Research, May 2007, 8(5):985-1005.
Szegedy et al., "Intriguing properties of neural networks," CoRR, Dec. 21, 2013, arxiv.org/abs/1312.6199, 10 pages.
Taori et al., "Measuring robustness to natural distribution shifts in image classification," Advances in Neural Information Processing Systems 33, 2020, 17 pages.
Theis et al., "Lossy image compression with compressive autoencoders," CoRR, Mar. 1, 2017, arxiv.org/abs/1703.00395, 19 pages.
Tokozume et al., "Between-class learning for image classification," Proceedings of the IEEE Conference on Computer Vision and Pattern Recognition (CVPR), 2018, pp. 5486-5494.
Torralba et al., "Unbiased look at dataset bias," CVPR, Jun. 20-25, 2011, 8 pages.
Van den Oord et al., "Neural discrete representation learning," Adv. Neural Inform. Process. Syst., 2017, 10 pages.
Vasiljevic et al., "Examining the impact of blur on recognition by convolutional networks," CoRR, Nov. 17, 2016, arXiv:1611.05760, 10 pages.
Wang et al., "Image quality assessment: from error visibility to structural similarity," IEEE Transactions on Image Processing, Apr. 2004, 13(4):600-612.
Wong et al., "Fast is better than free: Revisiting adversarial training," CoRR, Jan. 12, 2020, arxiv.org/abs/2001.03994, 17 pages.
Wong et al., "Learning perturbation sets for robust machine learning.," CoRR, Jul. 16, 2020, arxiv.org/abs/2007.08450, 32 pages.
Wu et al., "Adversarial weight perturbation helps robust generalization," Advances in Neural Information Processing Systems 33 (NeurIPS 2020), 2020, 12 pages.
Xiao et al., "Generating adversarial examples with adversarial networks," CoRR, Jan. 8, 2018, arXiv:1801.02610, 8 pages.
Xie et al., "Aggregated residual transformations for deep neural networks," CoRR, Nov. 16, 2016, arXiv:1611.05431, 10 pages.
Yin et al., "A fourier perspective on model robustness in computer vision," Advances in Neural Information Processing Systems 32 (NeurIPS 2019), 11 pages.
Yun et al., "Cutmix: Regularization strategy to train strong classifiers with localizable features," CoRR, May 13, 2019, arxiv.org/abs/1905.04899, 14 pages.
Zhang et al., "mixup: Beyond empirical risk minimization," CoRR, Oct. 25, 2017, arxiv.org/abs/1710.09412, 13 pages.
Zhang et al., "The unreasonable effectiveness of deep features as a perceptual metric," Proceedings of the IEEE Conference on Computer Vision and Pattern Recognition (CVPR), 2018, pp. 586-595.
Zhang et al., "Theoretically Principled Trade-off between Robustness and Accuracy," Proceedings of the 36th International Conference on Machine Learning, 2019, 97:7472-7482.
Zhang et al., "Understanding deep learning requires rethinking generalization," CoRR, Nov. 10, 2016, arXiv:1611.03530, 15 pages.

\* cited by examiner

TRAINING A NEURAL NETWORK USING OUTPUTS OF A CORRUPTION NEURAL NETWORK

BACKGROUND

This specification relates to training machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that trains a neural network for processing input data that include different corruptions.

The term "corruption" as used throughout this specification refers as a level of perturbation or deviation from an original input. Corruptions to inputs can include common corruptions and adversarial corruptions. The term "common corruption" refers to as a general and mild perturbation to an original input, e.g., blur, speckle noise, or fog for an image input. The term "adversarial corruption" as used throughout the specification refers to as a severe perturbation or deviation from an original input. For example, an image can be severely changed so that an output generated for the image by a neural network is changed, but the changed image still preserve some semantic content or meaning of the original input so that human brain can perceive/understand the changed input. In some implementations, the corruption can change the original meaning of an input, for example, one or more words in a text are changed to slightly affect the meaning of the text.

According to one aspect, a method includes: receiving a network input; and processing the network input using a first neural network to generate an output for a machine learning task, wherein the first neural network comprises a plurality of first neural network parameters. The first neural network has been trained on a set of training examples. The training includes receiving the set of training examples for training the first neural network, wherein each training example comprises a training network input and a reference output. The training further includes: for each training iteration in a set of training iterations: generating, for each training example of the set of training examples using a corruption neural network, a respective corrupted network input for the training network input in the training example, wherein the corruption neural network has a plurality of corruption neural network parameters and a plurality of perturbation parameters; updating, based on the respective corrupted network inputs, the plurality of perturbation parameters of the corruption neural network using a first objective function; generating, for each training example of the set of training examples using the corruption neural network with the updated perturbation parameters, a respective updated corrupted network input for the training network input in the training example; and generating, by processing the respective updated corrupted network inputs at least using the first neural network, a respective network output for each training network input in the set of training examples. For each training example in the set of training examples, based on (i) the respective network output for the respective updated corrupted network input for the training network input in the training example and (ii) the reference output in the training example, the training further includes updating the plurality of first neural network parameters using a second objective function.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented so as to realize one or more of the following advantages.

The techniques described in this specification can efficiently train a neural network for generating accurate network outputs for input data with different levels of corruption. To train the neural network, the described techniques can include data augmentation for generating inputs with bounded corruptions. In this way, the techniques can improve the accuracy of performing inference operations using the trained neural network for processing input with common corruptions or adversarial corruptions. In general, the existing techniques can generate good predictions for input data with either common corruptions or adversarial corruptions—not for inputs with common corruptions, adversarial corruptions, and arbitrary levels of corruption in between. The described techniques can achieve a mean corruption error (mCE) of 7.83% when generating predictions of input data from the CIFAR-10-C data set, whereas existing techniques (e.g., Perceptual Adversarial Training (PAT), AugMix, and DeepAugment) have a mCE of at least above 8.11% under the same setting.

The techniques described in this specification are robust compared to existing techniques. First, the described techniques are robust to different input data with different levels of corruption. The neural network is trained using augmented input data with bounded corruptions, and the training process is not confined to particular types of training samples or particular levels of corruption. In fact, the training can be performed for augmented input data of different types. The input data augmentation process is performed based on an upper bound (e.g., a perturbation radius threshold) so that the input data is not too severely perturbed to lose their original meaning. In addition, the described techniques can further prevent severe perturbations to input data using a similarity measure. In this way, the system can further prevent meaningless corruptions from happening during input data augmentation, even though the likelihood for this level of corruption to happen is pretty low when the augmentation process is constrained by the upper bound. Second, the described techniques are robust to different machine learning models for performing the augmentation process. In addition, the machine learning models for augmentation can include any suitable pre-trained corruption neural network. For example, the pre-trained corruption neural network can include one or more image-to-image neural networks with pre-trained network parameters for processing image data. The image-to-image neural networks can include any one or more of a VQ-VAE model, a U-Net model, an enhanced deep super-resolution network (EDSR), or a compressive autoencoder (CAE) for generating corruptions to the input data.

The described techniques are efficient in performing the augmentation process and the training process. The corruption network for generating corruptions to input data includes pre-trained neural networks, which can reduce the total computation cost and time for the augmentation and the training processes. In addition, the augmentation process is performed using a perturbation radius so that the input data can be ensured with sufficient perturbation for training a strong defense against common corruptions (i.e., improving the performance of the trained NN for processing inputs with various levels of corruption). The corrupted input data can maintain a reasonable level of meanings, i.e., without destroying the semantics, so that network outputs generated from the trained neural network can include meaningful predictions at least on the semantic level.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A general assumption in training a machine learning model is that training examples for training a machine learning model are collected or sampled from the same distribution as the data used for inference operations. However, training input data and inference input data for a neural network can be different in distribution, or different due to noises, biases, or corruptions during the data collection/sampling process. Machine learning models such as neural networks trained using training data different from inference data can generate less accurate or even erroneous predictions for inference data. It is therefore important to train machine learning models that are robust and generalized to inference inputs with various levels of corruption.

One existing technique that attempts to train a neural network that is robust to corruption applies randomly selected/generated corruptions to training data for training the neural network. However, training a neural network simply using corrupted training data only forces the memorization of such corruption patterns, and, as a result, networks trained this way fail to accurately process input data with different or new corruptions after training.

Other existing techniques use predefined corruptions or heuristically-determined corruptions to improve the robustness of models for processing input data with common corruptions. However, such techniques perform poorly on inference data with adversarial corruptions after training.

In addition, another technique can address robustness to pixel level corruptions in image data, which perform satisfactorily to diverse adversarial corruptions. However, this technique performs worse than techniques using predefined corruptions or heuristically-determined corruptions when processing input data with common corruptions. There are no existing techniques for processing scenarios where data are mildly corrupted (common corruptions), severely corrupted (adversarial corruptions), and arbitrarily corrupted between the common corruptions and the adversarial corruptions.

The techniques described in this specification can resolve at least the above-noted problems. More specifically, the described techniques are robust to (i) adversarial corruptions that attempt to cause a neural network to misclassify a given input while preserving semantic content and (ii) data with common corruptions. In addition, the described techniques leverage image-to-image pre-trained models to augment input data by producing a wide range of semantically-preserving corruptions to the input data, thereby improving the robustness of the neural network that is being trained. Furthermore, the described techniques do not determine corruptions using heuristic transformations, resulting in a trained neural network that is more robust to a wider range of differently corrupted data. The details of the techniques are described below.

Figure 1:
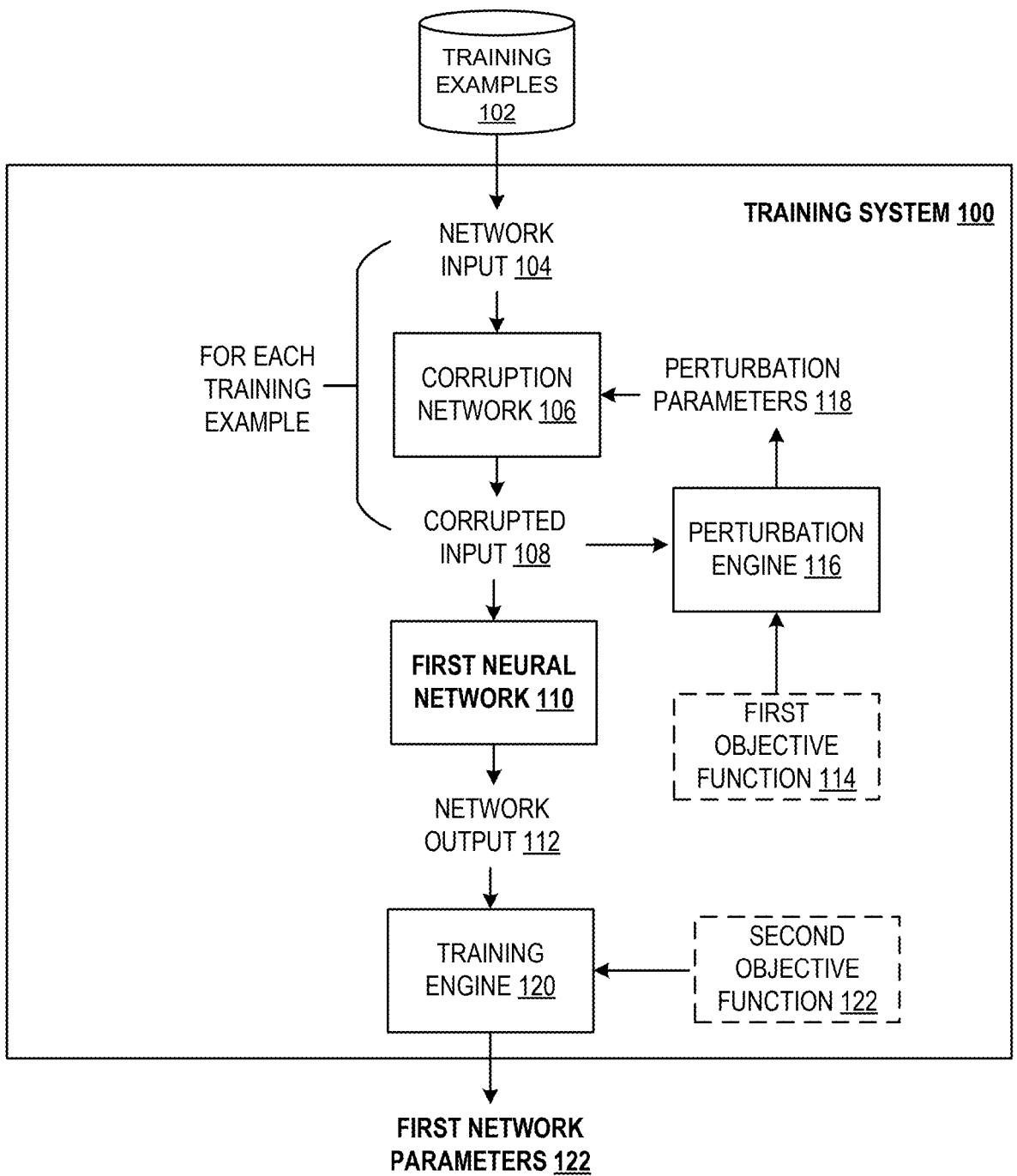
FIG. 1 is a block diagram of an example training system.

FIG. 1 is a block diagram of an example training system 100. The training system 100 is an example of a system implemented as computer programs on one or more computers in one or more locations in which the systems, components, and techniques described below are implemented.

The training system 100 trains a first neural network 110 having parameters ("first network parameters") for performing a machine learning task.

In general, the trained first neural network 110 can be configured to generate any of a variety of types of outputs, i.e., to perform any of a variety of types of machine learning tasks.

For example, the machine learning task can be to perform object detection or classification for a visual input that includes one or more input images or videos. In some implementations, for a classification task, the network output generated by the first neural network 110 can include a score distribution over a set of object classes. Each score in the score distribution can represent a predicted likelihood that the network input represents an object from a corresponding object class from the set of object classes.

As another example, the machine learning task can be an audio processing task. The audio input can include one or more input recordings and can be affected by corruptions such as background noises. For example, if the input to the first neural network 110 is an audio sequence representing a spoken utterance, the output generated by the first neural network 110 may be a score for each of a set of pieces of text, each score representing an estimated likelihood that the piece of text is the correct transcript for the utterance. Other example machine learning tasks that can be performed by the trained first neural network 110 are described in more detail below.

In particular, the trained first neural network 110 can be configured to generate accurate and robust predictions for input data when the input data are corrupted or deviated from the original versions. For example, when the input data includes image inputs, the input data can have common corruptions such as fog, blur, or speckle noise applied to the image inputs. As another example, the input data can have adversarial corruptions where image pixels, semantic blocks, or text phrases are minimally changed (e.g., semantically the same) to human eyes but are altered to become unperceivable to a trained neural network (e.g., the neural network is tricked to generate drastically altered outputs for the corrupted inputs).

The training system 100 can include a training engine 120 configured to train the first neural network 110 by updating the first network parameters at each of multiple training iterations. After training, the training system 100 can output the first neural network parameters 122 for the first neural network 110. The trained neural network 110 can be deployed for performing various tasks, as described above.

The training system 100 can train the first neural network 110 using training examples 102. When the system 100 is training the first neural network 110 using supervised learning, the training examples each include a network input 104 and a corresponding reference output. A reference output can also be referred to as a ground-truth output when labeling errors in the training example are ignored. The trained neural network, ideally, should generate a network output 112 for the network input 104 such that the network output 112 does not conflict with the reference output or the ground-truth output, e.g., by generating network outputs 112 that are the same as the corresponding reference outputs. If a network output 112 generated for the network input 104 conflicts with a corresponding reference output, the network output 112 contributes to a total loss for the first neural network 110. The total loss can be measured by an objective function (e.g., the second objective function 122) for training or optimizing the first neural network 110. The details of the objective function are described below.

To train the neural network 110 to have enhanced performance and accuracy for processing input data with different levels of corruption, the training system 100 implements advantageous techniques for generating corruptions to network inputs 104 during the training.

The training system 100 includes a corruption neural network 106 that the system 100 uses to generate corrupted network inputs 108 for network inputs 104, with each corrupted network input 108 representing a corrupted version of the corresponding network input 104. For example, the network input 104 can be an image frame representing a horse, and the corrupted input 108 can be a modified version of the image frame, where one or more pixel-wise values in the image frame are shifted, filtered, or altered, e.g., pixel values are shifted by a scalar or a vector, only high-frequency pixel values are kept, or red color channel pixel values are randomly set to different values. The details of generating corrupted network inputs 108 are described below.

For convenience, the operations performed by the training system 100 are described below for a single training iteration, where the training system 100 trains the first neural network 110 using multiple training examples in a batch of training examples 102. In practice, the training system 100 repeatedly performs training iterations to repeatedly update the first network parameters.

The training system 100 samples the batch of training examples from a set of training examples 102. The set of training examples 102 includes multiple training examples, where each training example includes a network input 104 and a corresponding reference output, as described above. For example, the network input 104 in a training sample can be an image frame with multiple pixels, and the reference output in the training sample can be classification data for the image frame, e.g., data indicating a cat is captured in the image frame.

During training, the training system 100 can process each network input (e.g., a network input 104), using the corruption neural network 106 to generate the corrupted input 108.

The corruption neural network 106 is a pre-trained neural network that maps a data input to another data input of the same type (e.g., an image-to-image neural network) with network parameters perturbed by a set of perturbation parameters 118.

The corruption neural network 106 can includes two sets of network parameters. The first set of network parameters are corruption neural network parameters that have been determined as a result of pre-training the corruption neural network 106. The corruption neural network parameters are fixed and will not be updated ("static"). The corruption neural network can be any suitable pre-trained neural network. Some of the pre-trained models can encode input data into latent variables, and decode the latent variables to reconstruct the input data (e.g., data of the same type). For example, when the first neural network 110 is a classifier neural network for processing input image data, the corruption neural network 106 can include one or more image-to-image neural networks. The image-to-image neural networks can be pre-trained with network parameters to generate output images for corresponding input images. For example, an image-to-image neural network can be a VQ-VAE, U-Net, EDSR, or CAE model.

The second set of network parameters in the corruption neural network 106 are perturbation parameters 118. The set of perturbation parameters are determined by the system at each training iteration. Each perturbation parameter corresponds to a static corruption network parameters. The determination process is described in greater detail below.

To generate the corrupted input 108 for a network input 104, the system uses parameter values that are a combination of the two sets of the network parameters. For example, the system can generate each of a new set of parameters values by summing (e.g., weighted sum) a respective corruption network parameter and a corresponding perturbation parameter for the corruption network parameter. The details of combination are described below.

Due to the perturbation parameters 118, the corruption network 106 would generate an output different from the original neural network for a common input.

During training, the system 100 performs one or more optimization iterations to update the perturbation parameters 118 for each training example (e.g., each network input 104). That is, the optimization iterations for updating the perturbation parameters 118 are different from the training iterations. Rather, the optimization iterations for updating the perturbation parameters 118 are performed for each training example during a single training iteration. The optimization process can be performed by a perturbation engine 116 included in the training system 100. In general, at each optimization iteration step, the perturbation engine 116 determines an update to the perturbation parameters 118 based on the corrupted input 108 for the current optimization iteration step using the first objective function 114. The details of the updating process are described in connection with FIG. 2B.

After updating or optimizing the perturbation parameters 118 for the corruption network 106, the training system 100 generates an updated corrupted input (e.g., corrupted input 108 at the last optimization iteration step) and provide it as an input for the first neural network 110. This can be implemented based on how the optimization iterations are performed. The details of generating the updated corrupted input at the last optimization iteration step are described below.

In some implementations, the system can further update the updated corrupted input using a line search technique to avoid extreme corruption. The details of the line search technique are described in connection with FIGS. 3A and 3B.

For each of the respective corrupted inputs 108, the system can process the respective corrupted input 108, using at least the first neural network 110, to generate a respective network output (e.g., a network output 112) for the respective corrupted input 118 (and, ultimately, the corresponding network input 104). For each training example in the batch of training example 102, the training system 100 can update the neural network parameters for the first neural network 110 based on (i) the respective network output for the corresponding network input 104 in the training example and (ii) the corresponding reference output in the training example.

The system can update the first network parameters using the second objective function 122. More specifically, the system can update the neural network parameters of the first neural network 110 by determining a gradient of the second objective function 122 for each training example (e.g., using backpropagation), and applying the gradients to update the neural network parameter values of the first neural network 110 using an appropriate gradient descent optimization technique, e.g., RMSprop or Adam. For example, the second objective function 122 can be a cross-entropy objective function. An example second objective function 122 is described in greater detail in connection with FIG. 2A.

Figure 2A:
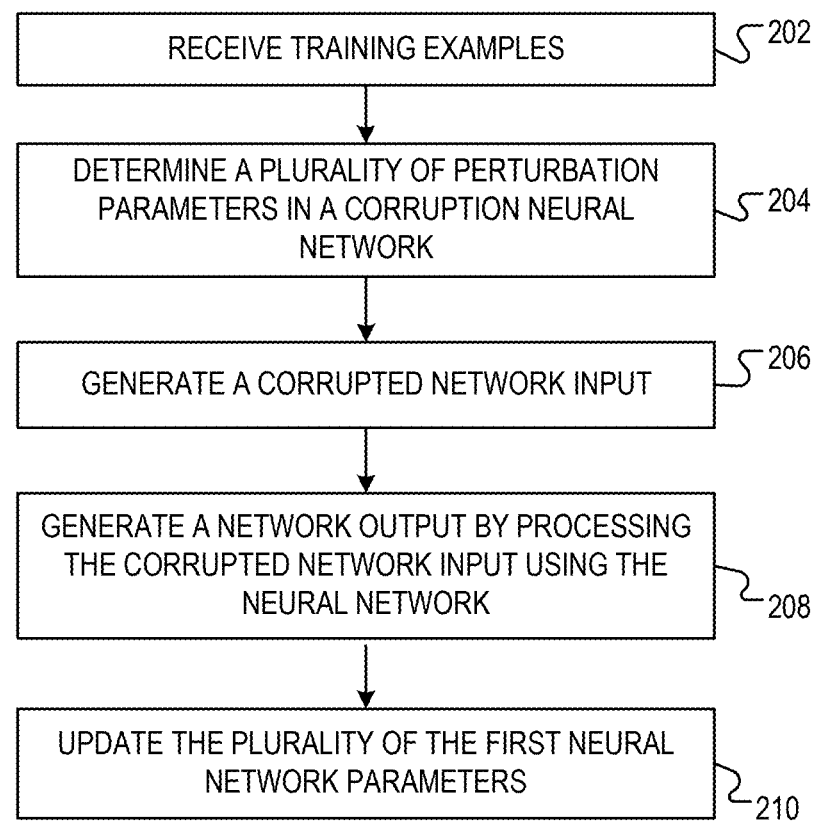
FIG. 2A is a flow diagram of an example process for training a neural network with a corruption neural network.

FIG. 2A is a flow diagram of an example process 200 for training a neural network with a corruption neural network. For convenience, process 200 will be described as being performed by a system of one or more computers located in one or more locations. For example, a training system, e.g., the training system 100 of FIG. 1, appropriately programmed in accordance with this specification, can perform the process 200. The neural network can be equivalent to the first neural network 110 of FIG. 1. The corruption neural network can be equivalent to the corruption network 106 of FIG. 1. The training process can include multiple training iterations. However, for simplicity, the process 200 represent operations performed in a single training iteration.

At a training iteration, the system receives a set of training examples for training a neural network (202). The neural network can be the first neural network 110 of FIG. 1. The set of training examples can be a batch or mini-batch of training examples for a particular training integration in multiple training iterations. Each training example in the set of training examples can include a training network input and a reference output. The reference output is the target output that should be generated by the neural network for processing the training network input, i.e., the output generated by performing the machine learning task on the input. The reference output also refers to ground-truth output for the training network input.

In some implementations, the neural network can be a classifier neural network configured to perform classification tasks. In these cases, the network input of a training example can include an image frame, e.g., an image representing a category such as a cat, a dog, or a horse. The corresponding reference output can be a category labeled for the network input. The first neural network 110 can be trained to classify which category an input image represents. The network output from the first neural network 110 can include a vector of probabilities each representing a likelihood that an input image represents a particular category. Alternatively, the network output from the first neural network 110 can include a particular token/label representing a particular category.

For simplicity, at the training iteration, the set of training examples are expressed as $(x, y) \sim D$, where $(x, y)$ can represent multiple pairs in the set of training examples, x represents network inputs, y represents corresponding reference outputs, and D represents the set of training examples.

At the training interaction, the system determines a plurality of perturbation parameters for a corruption neural network (204). The corruption neural network can generate corrupted network input for a particular network input. For image classification applications, the corruption neural network can generate output images with corruptions such as blur, noise, or fog. In some situations, the corruption network can include one or more pre-trained image-to-image neural networks.

The corruption neural network includes multiple corruption neural network parameters and multiple perturbation parameters. The multiple corruption neural network parameters can be pre-trained and remain static during the training process. In some implementations, the corruption neural network has been pre-trained with the plurality of perturbation parameters being set to respective values that do not impact inference operations of the corruption neural network. For example, the perturbation parameters can be set as zero.

The perturbation parameters can be determined by the system for each training iteration. In general, the corruption neural network can include one or more network layers. Each layer includes one or more corruption neural network parameters of the multiple corruption neural network parameters. Each layer also includes one or more perturbation parameters of the multiple perturbation parameters. The corruption neural network receives network inputs in training examples to generate corrupted network inputs.

The corruption neural network parameters can be expressed as $\phi = \{\phi_i\}_{i=1}^{K}$, where the index i represents an $i^{th}$ layer of the corruption neural network, and K represents the total number of layers in the corruption neural network. Similarly, the perturbation parameters can be expressed as $\delta = \{\delta_i\}_{i=1}^{K}$.

In general, the corruption neural network parameters $\phi$ and the perturbation parameters $\delta$ can share the same form or data structure. To distinguish, the corruption neural network is also referred to as a corruption neural network being affected by perturbation parameters $\delta$ can be expressed as $c_{\phi+\delta}(x)$. A corruption neural network only having pre-trained network parameters $\phi$ without being affected by perturbation parameters $\delta$ can be expressed as $c_{\phi}(x)$. The two different expressions for the corruption neural network are generally interchangeable by setting by perturbation parameters $\delta$ to be zero. For simplicity, the corruption neural network used throughout the specification is referred to as a corruption neural network being affected by perturbation parameters δ.

To perturb network parameters ϕ for the corruption neural network $c_\phi(x)$, the system can first select an $i^{th}$ layer of multiple network layers in the corruption neural network $c_\phi(x)$. The system can determine one or more corruption network parameters $\phi_i$ for the $i^{th}$ layer from the network parameters ϕ, and determine one or more perturbation parameters $\delta_i$ for the $i^{th}$ layer from the perturbation parameters δ. Because the corruption neural network parameters ϕ and the perturbation parameters δ share the same form or data structure, the one or more corruption network parameters $\phi_i$ and the one or more perturbation parameters $\delta_i$ for the $i^{th}$ layer share the same form or data structure, i.e., vectors or matrices of a common size. The system can combine the parameters $\phi_i$ and $\delta_i$ to generate network parameters $\phi_i+\delta_i$ for the $i^{th}$ layer of the corruption neural network $c_{\phi+\delta}(x)$ affected by perturbation parameters δ. In general, the system can select one or more layers of the corruption neural network $c_\phi(x)$ to perturb corresponding network parameters ϕ with corresponding perturbation parameters δ. In some implementations, the system can perturb each layer of the corruption neural network, i.e., $$c_{\phi+\delta}(x) = c_{\{\phi_i+\delta_i\}_{i=1}^K}(x).$$

In general, the perturbation parameters δ are bound or constrained to cause the corruption neural network (e.g., corruption network 106) to generate meaningful perturbations to the network inputs. For example, if $c_\phi(x)$ represents a multi-layer perceptron, trivially setting δ=−ϕ would cause the multi-layer perceptron to generate zero, uninformative outputs for any given inputs. Therefore, the system restricts the perturbation parameters using a perturbation radius threshold ν>0. The details of determining the perturbation parameters using the perturbation radius threshold ν are described in connection with FIG. 2B.

For each training example of the set of training examples, the system generates a respective corrupted network input for the training network input in the training example using the corruption neural network with the determined/updated perturbation parameters (206). For example, the system can determine the set of corrupted network inputs using Equation (1), as presented below:

$$x'=c_{\phi+\delta^M}(x) \hspace{2cm} \text{Equation (1).}$$

Regarding Equation (1), perturbation parameters $\delta^M$ represents values of the perturbation parameters after M optimization iterations. The term x' represents the corrupted network input for the network input x in the training examples (x,y).

In some implementations, the system can verify whether the respective corrupted network inputs include meaningful corruptions by performing a line search technique. The line search technique can prevent the system from generating severe corruptions. The details of the line search technique are described in connection with FIGS. 3A and 3B.

The system generates a respective network output for each training network input in the set of training examples by processing the respective corrupted network inputs using the neural network (208). For example, the neural network can be expressed as $f_\theta(x)$, where the term θ represents the neural network parameters in the neural network. The system can obtain the respective network outputs using the expression as below:

$$y'=f_\theta(x') \hspace{2cm} \text{Equation (2).}$$

The system updates the plurality of the first neural network parameters for the training iteration (210). More specifically, for each training example x in the set of training examples (x, y)~D, based on (i) the respective network output y' for the respective updated corrupted network input x' and (ii) the reference output y in the training example (x, y), the system updates, at each optimization iteration, the plurality of first neural network parameters using a second objective function. An example second objective function can be expressed as below:

$$L_2=\widetilde{L}_2(f_\theta(x'),y) \hspace{2cm} \text{Equation (3).}$$

Note that the term $L_2$ represents the second loss generated from the second objective function $\widetilde{L}_2$, the expectation of which can also be referred to as a corrupted adversarial risk. The second objective function $\widetilde{L}_2$ can represent one or more of a zero-one loss (i.e., $L_2(y', y)=I(y' y)$), hinge loss, cross-entropy loss, or other suitable losses.

To train the neural network, the system can minimize the expectation value of the second loss $L_2$ for the set of training examples. In other words, the system can determine a set of neural network parameters for the neural network that minimize the corrupted adversarial risk. The optimization problem can be expressed as below:

$$\theta^*=\text{argmin}_\theta E_{(x,y)\sim D}[\widetilde{L}_2(f_\theta(x'),y)] \hspace{1cm} \text{Equation (4).}$$

The term θ* represents the neural network parameters after training the neural network, which can be equivalent to the first network parameters 122 of FIG. 1. Another equivalent expression of optimization problem represented by Equation (4) is described in connection with FIG. 2B.

At the training iteration (e.g., step t), the system can update the parameters θ for the current iteration step based on the parameters θ at a previous iteration step and the gradient of the second objective function. One example equation for updating the network parameters θ is expressed as below:

$$\theta^{(t)} = \theta^{(t-1)} + \eta_f \nabla_\theta [\widetilde{L}_2(f_\theta(x'), y)]|_{\theta=\theta^{(t-1)}} . \hspace{0.5cm} \text{Equation (5)}$$

Note t represents a particular training iteration step, which ranges from one to a total number N of iterations. The term $n_f$ represents a learning rate for the gradient descent iteration steps. The system outputs the network parameters $\theta^{(t)}$ as the trained neural network parameters when the network parameters $\theta^{(t)}$ converge, or when the current iteration step t reaches an iteration limit, e.g., N times of iteration.

Figure 2B:
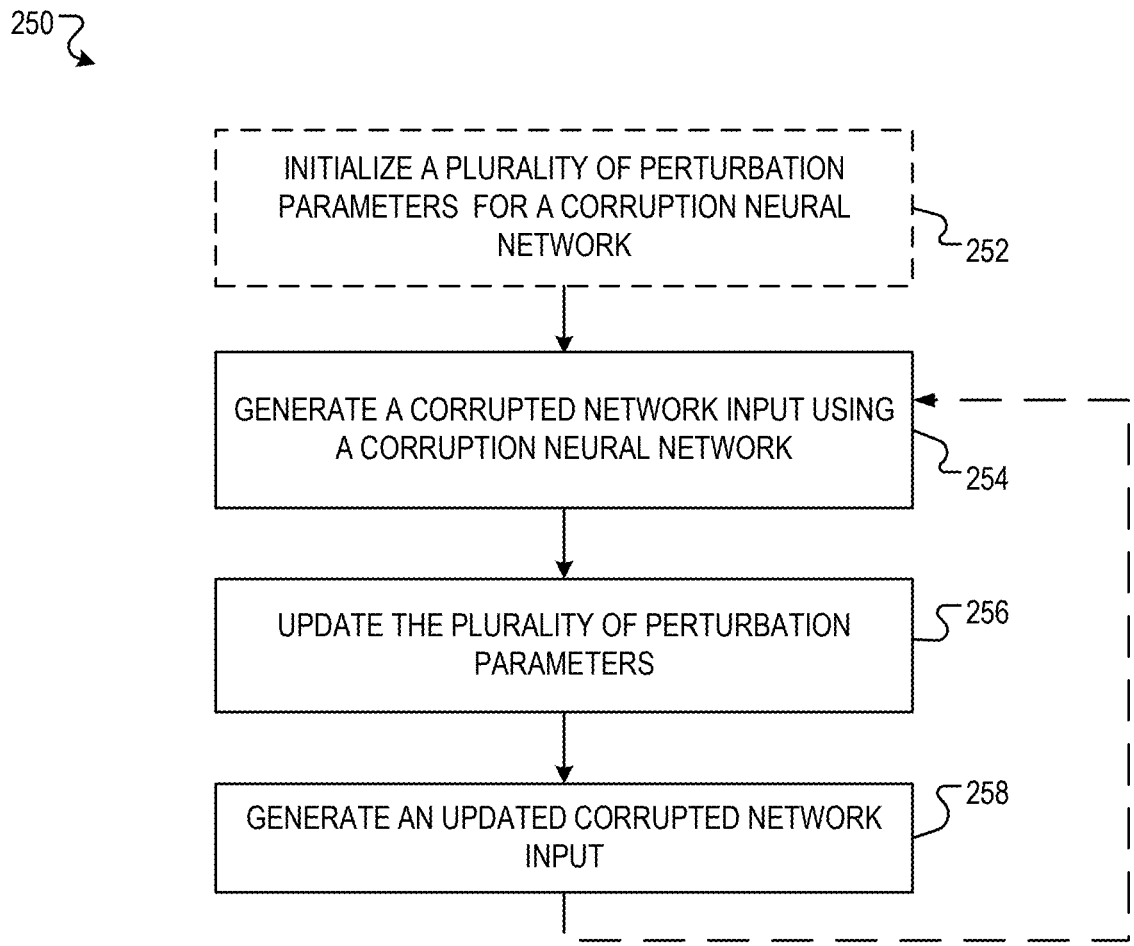
FIG. 2B is a flow diagram of an example process for determining corruption parameters for a corruption neural network.

FIG. 2B is a flow diagram of an example process for determining corruption parameters for a corruption neural network. For convenience, the process 250 will be described as being performed by a system of one or more computers located in one or more locations. For example, a training system, e.g., the training system 100 of FIG. 1, appropriately programmed in accordance with this specification, can perform the process 250. The corruption neural network can be equivalent to the corruption network 106 of FIG. 1.

In general, the system determines multiple perturbation parameters in a corruption neural network by updating the multiple perturbation parameters of the corruption neural network using the first objective function. The first objective function can be expressed as below:

$$L_1 = \widetilde{L}_1(f_\theta(c_{\phi+\delta}(x)), y) \qquad \text{Equation (6)}.$$

Note that the term $L_1$ represents the first loss generated from the first objective function $\widetilde{L}_1$. The first objective function $\widetilde{L}_1$ can represent one or more of a zero-one loss, hinge loss, cross-entropy loss, or other suitable losses.

The first objective function $\widetilde{L}_1$ is generally different from the second objective function $\widetilde{L}_2$ because the second loss function $\widetilde{L}_2$ receives as input the updated corrupted network inputs x', which are obtained using corruption neural network with determined perturbation parameters δ after multiple optimization iterations (see Equation (1)).

To determine the perturbation parameters δ, the system can generate an optimization problem using the first objective function, and the optimization process is performed under one or more constraints. For example, the system can restrict the perturbation parameters by a perturbation radius threshold v. The generation of a corrupted network input can be expressed as below:

$$C(x) = \{c_{\phi+\delta}(x) | \|\delta\|_{2,\phi} \leq v\} \qquad \text{Equation (7)}.$$

The conditional term $\|\delta\|_{2,\phi} \leq v$ can be further expressed as below:

$$\|\delta\|_{2,\phi} = \max_{i \in \{1, \ldots, K\}} \|\delta_i\|_2 / \|\phi_i\|_2 \leq v. \qquad \text{Equation (8)}$$

The term $\|\delta\|_{2,\phi}$ represents a maximum value among multiple ratios for network layers in the corruption neural network. Each ratio for the $i^{th}$ layer of all layers can be determined by an L2 norm for one or more perturbation parameters $\delta_i$ for the $i^{th}$ layer of all layers and an L2 norm for one or more network parameters $\phi_i$ for the $i^{th}$ layer of all layers.

The optimization problem for determining the perturbation parameters can be expressed as below:

$$\max_{\|\delta\|_{2,\phi} \leq v} \widetilde{L}_1(f_\theta(c_{\phi+\delta}(x)), y). \qquad \text{Equation (9)}$$

An optimization problem with one or more constraints can be solved using various gradient descent methods. For example, the system can perform projected gradient ascent method to enforce that perturbation parameters δ lie within the feasible set $\|\delta\|_{2,\phi} \leq v$. The output of the optimization problem can be considered equivalent to the second objective function of Equation (3). Therefore, the optimization problem for training a neural network represented by Equation (4) can also be expressed as below:

$$\theta^* = \mathrm{argmin}_\theta E_{(x,y) \sim D}\left[ \max_{\|\delta\|_{2,\phi} \leq v} \widetilde{L}_1(f_\theta(c_{\phi+\delta}(x)), y) \right]. \qquad \text{Equation (10)}$$

Referring back to determining multiple perturbation parameters δ for the corruption neural network, for each training iteration of the multiple training iterations and before generating a corrupted network input (e.g., corrupted input 108 of FIG. 1) for the training iteration, the system can optionally initialize multiple perturbation parameters for a corruption neural network (252). For example, the system can initialize the multiple perturbation parameters $\delta^{(0)}$ using a probability distribution. The probability distribution can be a uniform distribution, a normal distribution, or any other suitable distribution.

In some implementations, the system can initialize multiple perturbation parameters $\delta^{(0)}$ considering one or more constraints. For example, the constraints can be generated using a perturbation radius threshold v. In some implementations, the system determines, for each layer of the K network layers in the corruption network, a radius r sampled from a distribution space, e.g., a normal distribution of $r \sim U(0, v\|\phi_i\|_2)$. The system then initializes, for the layer, one or more perturbation parameters $\delta_i^{(0)}$ by uniformly generating a random vector of the same shape as $\phi_i$ with a length equal to the radius r. In some implementations, the system can initialize perturbation parameters in a layer at a current training iteration reusing initial values determined for the perturbation parameters in the layer at a previous training iteration.

For each optimization iteration of multiple optimization iterations for determining perturbation parameters for the $i^{th}$ layer in the corruption neural network at a particular training iteration, the system can generate, using the corruption neural network with perturbation parameters at the optimization iteration, corrupted network inputs each for a training network input in the training example of the set of training examples. For example, for the j−1 iteration, the corrupted network inputs can be generated using the equation $x'_{j-1} = c_{\phi+\delta(x)}|_{\delta=\delta_{j-1}}$, where j ranges from 1 to M iterations.

For each of the corrupted network inputs generated for the j−1 optimization iteration, the system generates a corrupted network input using the corruption neural network with perturbation parameters determined for the j−1 optimization iteration (254). For example, for the j−1 iteration, the respective network outputs for the respective corrupted network inputs can be generated using the equation $f_\theta(c_{\phi+\delta}(x))|_{\delta=\delta_{j-1}}$, where j ranges from 1 to M iterations.

To update the perturbation parameters (256) at an optimization iteration step (e.g., the j−1 iteration), the system can determine a gradient of the first objective function for the iteration step, and generate the perturbation parameters for a next iteration step based on the perturbation parameters at the iteration step and the gradient. One example equation for updating the perturbation parameters for the j−1 iteration is expressed as below:

$$\delta^j = \delta^{j-1} + \eta_c \mathrm{sign}[\nabla_\delta \widetilde{L}_1(f_\theta(c_{\phi+\delta}(x)), y)]|_{\delta=\delta_{j-1}} \qquad \text{Equation (11)}$$

After updating the perturbation parameters for the current optimization iteration step, the system needs to ensure the updated perturbation parameters satisfy the above-described constraint based on the perturbation radius threshold v.

More specifically, for each layer i in the corruption neural network at the iteration step j, the system can determine whether the updated perturbation parameters for the layer satisfy the constraint based on perturbation radius threshold. For example, for the $i^{th}$ layer of the corruption neural network and the $j^{th}$ iteration, the system can determine using the equation expressed as below:

$$\|\delta_i^{(j)}\|_2 > v\|\phi_i\|_2 \qquad \text{Equation (12)}.$$

If the above-noted inequality holds for the $j^{th}$ iteration, the system determines that the updated perturbation parameters for the $i^{th}$ layer do not satisfy the constraint. In response, the system then generates a coefficient for the one or more perturbation parameters $\delta_i^{(j)}$.

To generate the coefficient, the system generates a first magnitude for the one or more perturbation parameters $\delta_i^{(j)}$ for the $i^{th}$ layer, for example, an L2 norm of the perturbation parameters $\delta_i^{(j)}$, i.e., $\|\delta_i^{(j)}\|_2$.

The system generates a second magnitude for the respective one or more corruption neural network parameters $\phi_i$ for the $i^{th}$ layer, for example, an L2 norm of the corruption neural network parameters $\phi_i$, i.e., $\|\phi_i\|_2$.

The system generates the coefficient by generating a ratio between the first magnitude and the second magnitude. For example, the ratio can be expressed as below:

$$\text{ratio} = \nu\|\phi_i\|_2/\|\delta_i^{(j)}\|_2. \quad \text{Equation (13)}$$

The system can update the perturbation parameters to enforce the above-described constraint based on the coefficient, e.g., the above-noted ratio. For example, the perturbation parameters for the $i^{th}$ layer at the $j^{th}$ iteration can be updated using the equation $\delta_i^{(j)}=\delta_i^{(j)}*$ ratio. In this way, the constraint for performing the optimization problem using the first objective function can be ensured.

After updating the perturbation parameters for the $i^{th}$ layer at the $j^{th}$ iteration, the system can generate updated corrupted network inputs for the corresponding network inputs using the updated perturbation parameters (258).

In general, the system can repeat the steps 254, 256, and 268 until the perturbation parameters $\delta$ are converged, or until the optimization iterations reach an iteration limit, e.g., a number of K iterations.

Figure 3A:
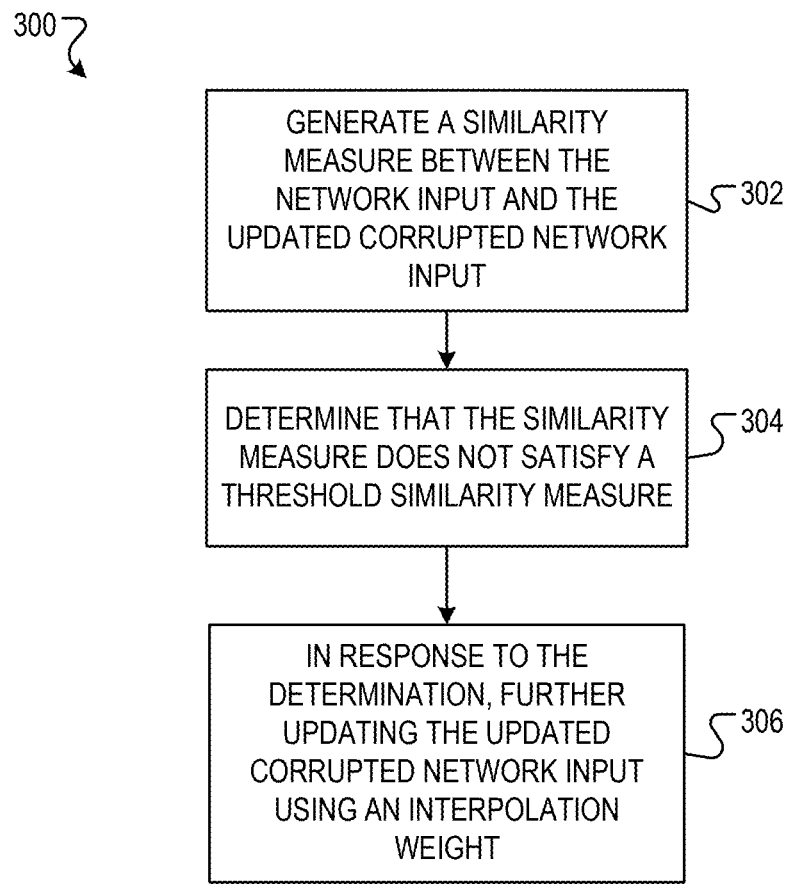
FIG. 3A is a flow diagram of an example process for updating a corrupted network input based on a similarity measure.

FIG. 3A is a flow diagram of an example process 300 for updating a corrupted network input based on a similarity measure. For convenience, the process 300 will be described as being performed by a system of one or more computers located in one or more locations. For example, a training system, e.g., the training system 100 of FIG. 1, appropriately programmed in accordance with this specification, can perform the process 300.

After determining the perturbation parameters for the corruption neural network, the system can generate corrupted network inputs x' for network inputs x using the corruption neural network with determined perturbation parameters, e.g., $\delta^{(M)}$, as described above.

The system can further verify the respective corrupted network inputs include meaningful corruptions. For example, the system can perform such a verification using a similarity measure.

More specifically, the system first generates, for each of the respective updated corrupted network inputs, a similarity measure between the network input and the respective updated corrupted network input (302). For example, the similarity measure can be the structural similarity index measure (SSIM). In general, a SSIM value can be determined by comparing luminance, contrast, and structure between two different image inputs, which represents image degradation between the two image inputs. In this example, the two different image inputs can be a pair of a network input x and a corrupted network input x' generated for the network input x.

The system determines whether the similarity measure satisfies a threshold similarity measure (304). The threshold similarity value can be pre-determined by a user or by the system. The threshold similarly value t can be any suitable value for a particular training requirement. For example, the threshold similarly value t can be 0.3 for CIFAR-10 database, or 0.7 for IMAGENET database. The system can, for example, determine that the similarity measure does not satisfy the threshold similarity measure when the similarity measure is greater than the threshold similarity measure.

In response to determining that the similarity measure does not satisfy a threshold similarity measure, the system further updates the respective updated corrupted network input based on an interpolation weight to satisfy the threshold similarity measure (306). The further update can be expressed as below:

$$x_\gamma=(1-\gamma)x+\gamma x' \quad \text{Equation (14)}$$

where the interpolation weight is a scalar and is denoted by $\gamma$. The interpolation weight is a real number between zero and one, and the further updated corrupted network input $x_\gamma$ can cause the similarity value to satisfy a threshold similarity value, for example, SSIM $(x, x_\gamma)=t$. The determination of the interpolation weight is described in greater detail below.

Figure 3B:
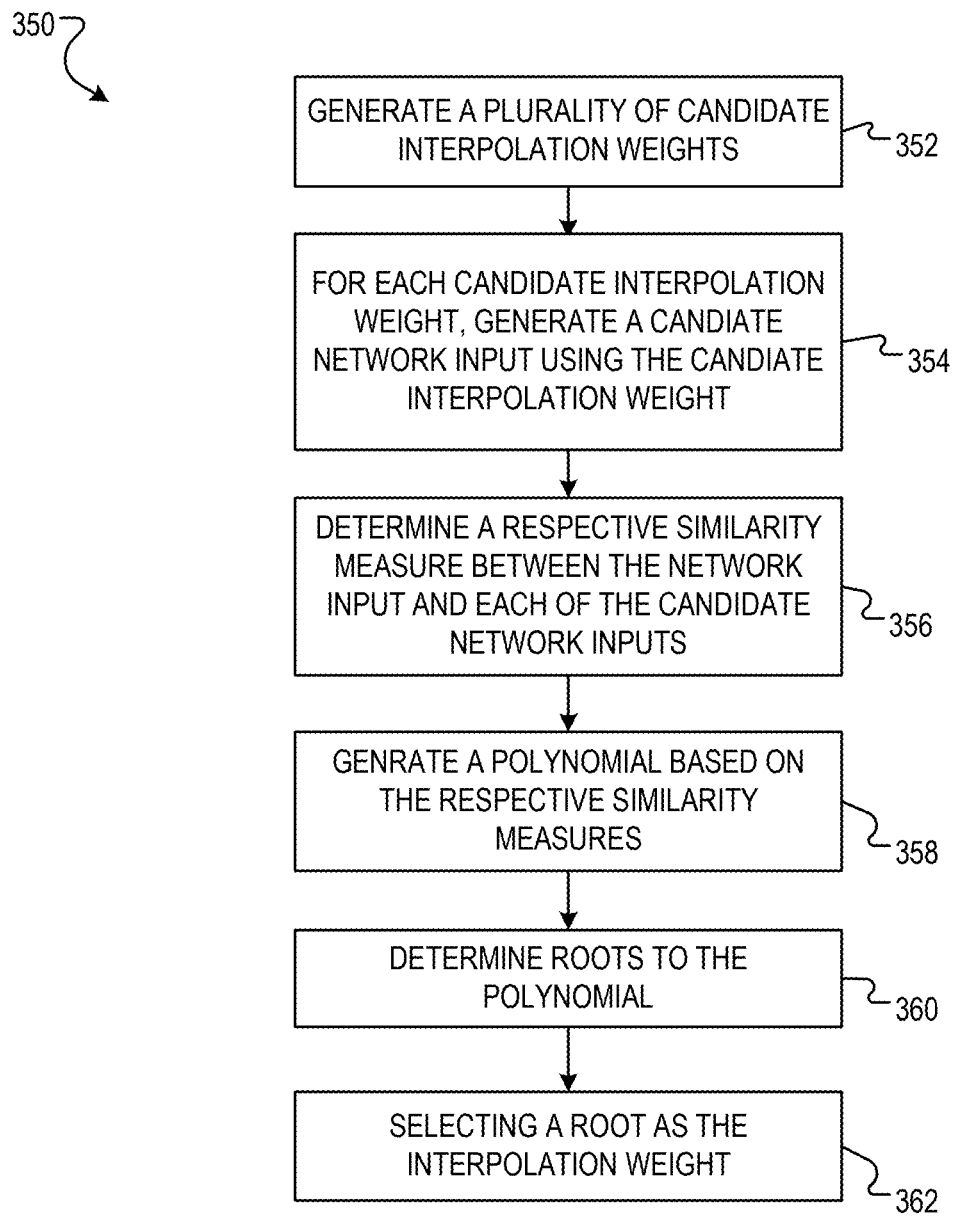
FIG. 3B is a flow diagram of an example process of determining an interpolation weight for updating a corrupted network input.

FIG. 3B is a flow diagram of an example process 350 of determining an interpolation weight for updating a corrupted network input. For convenience, the process 350 will be described as being performed by a system of one or more computers located in one or more locations. For example, a training system, e.g., the training system 100 of FIG. 1, appropriately programmed in accordance with this specification, can perform the process 350.

The system generates a plurality of candidate interpolation weights (352). For example, the system can generate candidate interpolation weights that are multiple equality spaced values between zero and one, e.g., a set of candidate interpolation weights of [0.1, 0.2, 0.3, 0.4, 0.5, 0.6, 0.7, 0.8, 0.9]. Other techniques for generating the candidate interpolation weights are feasible and can be determined by particular training requirements.

For each candidate interpolation weight of the candidate interpolation weights, the system generates a candidate corrupted network input $x_{\gamma_c}$ from the respective updated corrupted network input using the candidate interpolation $\gamma_c$ (354). More specifically, the system can generate the candidate corrupted network input $x_{\gamma_c}$ using the Equation (14).

The system determines a respective similarity measure between the network input and the candidate corrupted network input (356). For example, the system can determine an SSIM value for the candidate corrupted network input $x_{\gamma_c}$, i.e., SSIM(x, $x_{\gamma_c}$).

The system generates a polynomial based on the respective similarity measures and the threshold similarity measure (358). For each of the candidate interpolation weights, the system can obtain differences between the respective similarity values and the threshold similarly value, e.g., SSIM(x, $x_{\gamma_c}$)−t. The system can fit a quadratic polynomial with respect to the interpolation weight $\gamma$ based on the differences.

The system determines roots to the polynomial (360). The root to the polynomial are values $x_{\gamma^*}$ such that SSIM(x, $x_{\gamma^*}$)=t. The roots to the polynomial can be expressed as $\gamma^*$.

The system selects, as the interpolation weight, a root from the roots to the polynomial (362). For example, the system can select one of the roots $\gamma^*$ that is closest to the value one as the interpolation weight $\gamma$ for step 304.

The above-described process for determining the interpolation weight is efficient, as it requires no iterations and can be accelerated using hardware accelerators, e.g., GPUs, or TPUs.

One example algorithm for the above-described techniques can be generally expressed as below:

Algorithm 1

AdA, our proposed method.

1: Inputs: training dataset D; classifier's ($f_\theta$) initial parameters $\theta^{(0)}$; corruption network $e_\phi$; corruption network's pretrained parameters $\phi$; relative perturbation radius over the corruption network's parameters $\nu$; number of layers of the corruption network K; learning rate $\eta_f$ and number of gradient descent steps N for the outer optimization; learning rate $\eta_c$ and number of projected gradient ascent steps M for the inner optimizlation.
2: for t = 1 ... N do     ▷ Outer optimization over $\theta$.
3:   (x, y) ~ D
4:   for i = 1 ... K do     ▷ Initialize $\delta$ perturbation.
5:     r ~ U(0, $\nu \|\phi_i\|_2$)
6:     $\delta_i^{(0)}$ = uniformly random vector of the same shape as $\phi_i$ with length equal to r
7:   for j = 1 ... M do     ▷ Inner optimization over $\delta$ using PGD.

8:     $\delta^{(j)} = \delta^{(j-1)} + \eta_c \text{sign}[\nabla_\delta \tilde{L}(f_\theta(c_{\phi+\delta}(x)), y)]|_{\delta = \delta^{(j-1)}}$     ▷ FGSM step.

9:     for i = 1 ... K do     ▷ Project $\delta_i$ to lie in $\nu$-length $\ell_2$-ball around $\phi_i$.
10:       if $\|\delta_i^{(j)}\|_2 > \nu \|\phi_i\|_2$ then 11:         $\delta_i^{(j)} = \dfrac{\delta_i^{(j)}}{\|\delta_i^{(j)}\|_2} \cdot \nu \|\phi_i\|_2$ 12:   x' = $c_{\phi + \delta^{(M)}}(x)$     ▷ The adverslarial example x'.
13:   x' = SSIMLineSearch(x, x')     ▷ Approx. SSIM line-search: App. F.

14:   $\theta^{(t)} = \theta^{(t-1)} - \eta_f \nabla_\theta \tilde{L}(f_\theta(x'), y)|_{\theta = \theta^{(t-1)}}$     ▷ Update classifier parameters.

15: Return optimized classifier parameters $\theta^{(N)}$ where the SSIMLineSearch( ) function in the above example algorithm can be implemented using the steps described in FIG. 3B.

Figure 4:
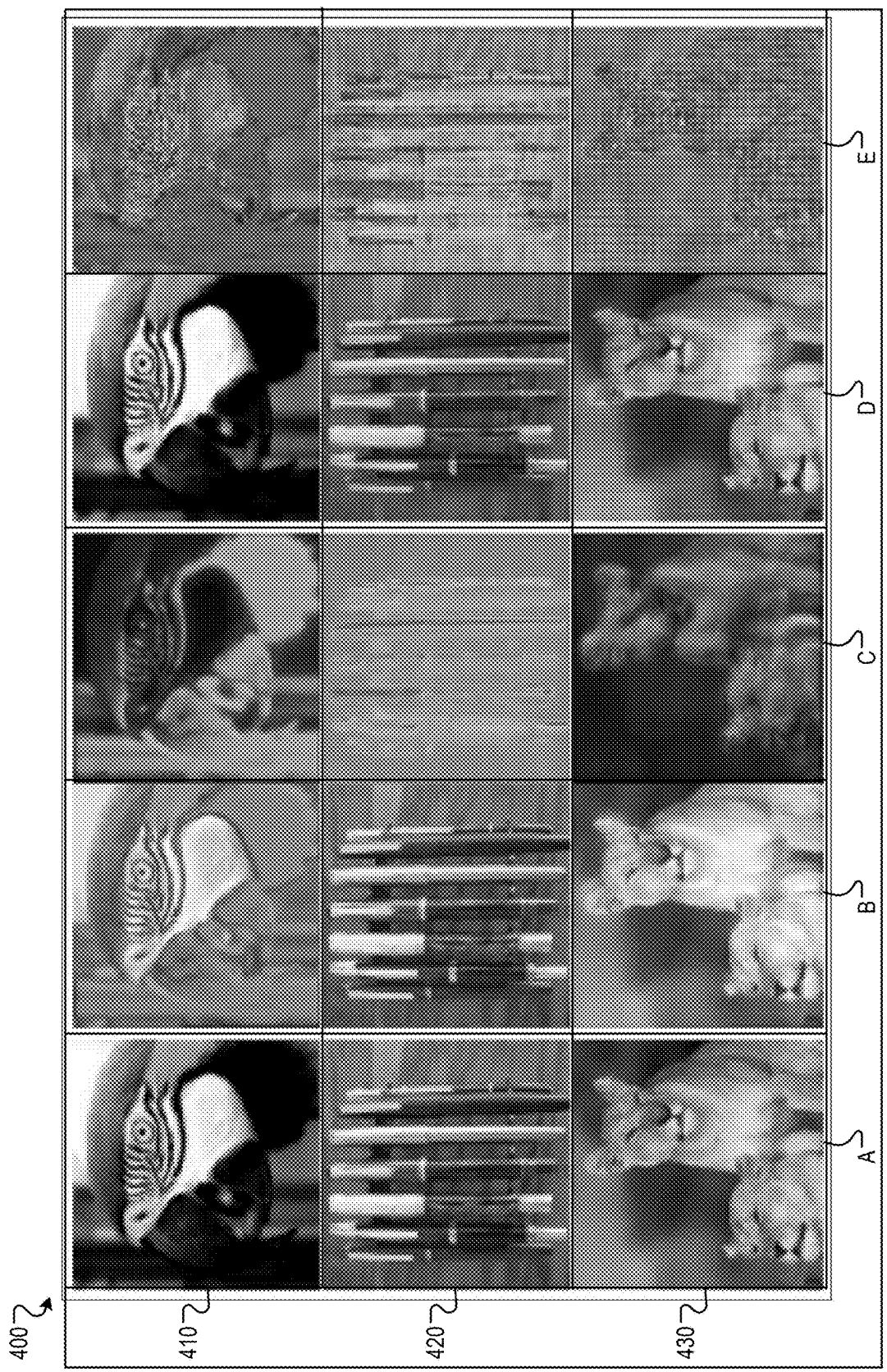
FIG. 4 illustrates examples of corruptions to input data generated using a corruption neural network.

FIG. 4 illustrates examples of corruptions 400 to input data generated using a corruption neural network.

As shown in FIG. 4, each row 410, 420, and 430 represents images including a respective category. For example, the first row 410 represents images capturing a bird, the second row 420 represents images capturing a pen, and the third row 430 represents images capturing a lion.

The first column A represents original images, and the other columns B, C, D, E represent a different type or level of corruption to the original images. All of the images in columns B, C, D, E are generated using the corruption neural network described above, e.g., the corruption neural network 106 of FIG. 1.

The images in columns B and C are generated using a backbone architecture, e.g., the enhanced deep super-resolution network (EDSR), and the images in columns D and E are generated using another backbone architecture, e.g., the contractive autoencoder (CAE). More specifically, the images in column B represent adversarial examples generated for corresponding original images in column A using the above-described corruption neural network and EDSR backbone architecture, and the images in column C represent the exaggerated differences between corresponding images in columns A and B. Similarly, the images in column D represent adversarial examples generated for corresponding original images in column A using the above-described corruption neural network and CAE backbone architecture, and the images in column E represent the exaggerated differences between corresponding images in columns A and D.

As shown in FIG. 4, the adversarial images shown in columns B and D have local and global color shifts compared against the original images in column A. However, the adversarial examples generated using the EDSR backbone architecture preserve high-frequency details, and the ones generated using the CAE backbone architecture do not. The adversarial examples generated using the CAE backbone architecture exhibit grid-like artifacts due to the transposed convolutions in the CAE decoder.

The neural network (e.g., the first neural network 110 of FIG. 1) can be configured to perform various tasks. For example, the neural network can be configured, i.e., through training, to receive any kind of digital data input and to generate any kind of score, classification, or regression output based on the input.

In some cases, the neural network is a neural network that is configured to perform an image processing task, i.e., receive an input image and process the input image to generate a network output for the input image. In this specification, processing an input image refers to processing the intensity values of the pixels of the image using a neural network. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted. As yet another example, the task can be image segmentation and the output generated by the neural network can assign each pixel of the input image to a category from a set of categories.

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, the task may be a keyword spotting task where, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrasing task, a textual similarity task, a sentiment task, a sentence completion task, a grammaticality task, and so on, that operates on a sequence of text in some natural language.

As another example, the task can be a text to a speech task, where the input is text in a natural language or features of the text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the neural network is configured to perform multiple different individual machine learning tasks, e.g., two or more of the machine learning tasks mentioned above. For example, the neural network can be configured to perform multiple individual natural language understanding tasks. Optionally, the network input can include an identifier for the individual natural language understanding task to be performed on the network input. As another example, the neural network can be configured to perform multiple individual image processing or computer vision tasks, i.e., by generating the output for the multiple different individual image processing tasks in parallel by processing a single input image.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising: receiving a network input; and processing the network input using a first neural network to generate an output for a machine learning task, wherein the first neural network includes a plurality of first neural network parameters, where the first neural network has been trained on a set of training examples, the training comprising: receiving the set of training examples for training the first neural network, where each training example includes a training network input and a reference output; for each training iteration in a set of training iterations: generating, for each training example of the set of training examples using a corruption neural network, a respective corrupted network input for the training network input in the training example, where the corruption neural network has a plurality of corruption neural network parameters and a plurality of perturbation parameters; updating, based on the respective corrupted network inputs, the plurality of perturbation parameters of the corruption neural network using a first objective function; generating, for each training example of the set of training examples using the corruption neural network with the updated perturbation parameters, a respective updated corrupted network input for the training network input in the training example; and generating, by processing the respective updated corrupted network inputs at least using the first neural network, a respective network output for each training network input in the set of training examples; and for each training example in the set of training examples, based on (i) the respective network output for the respective updated corrupted network input for the training network input in the training example and (ii) the reference output in the training example, updating the plurality of first neural network parameters using a second objective function.

Embodiment 2 is the method of Embodiment 1, wherein updating the plurality of perturbation parameters of the corruption neural network using the first objective function comprises updating the plurality of perturbation parameters while constraining the plurality of perturbation parameters to satisfy a constraint based on a perturbation radius threshold.

Embodiment 3 is the method of Embodiment 2, wherein updating the plurality of perturbation parameters of the corruption neural network comprises repeatedly updating the plurality of perturbation parameters for a plurality of iterations, wherein for each iteration of the plurality of iterations: generating, using the corruption neural network, a respective corrupted network input for each training network input in the set of training examples for the iteration; and updating, based on the respective corrupted network inputs for the iteration, the plurality of perturbation parameters of the corruption neural network by optimizing the first objective function.

Embodiment 4 is the method of Embodiment 3, wherein the corruption neural network comprises one or more network layers, wherein each layer of the one or more network layers has respective one or more corruption neural network parameters of the plurality of corruption neural network parameters and respective one or more perturbation parameters of the plurality of perturbation parameters, wherein constraining the plurality of perturbation parameters to satisfy the constraint based on the perturbation radius threshold comprises: for each iteration of the plurality of iterations: determining, for each layer of the one or more network layers, that the respective one or more perturbation parameters for the layer do not satisfy the constraint based on the perturbation radius threshold; generating a respective coefficient for the respective one or more perturbation parameters; and further updating, using the respective coefficient, the respective one or more perturbation parameters of the layer.

Embodiment 5 is the method of Embodiment 4, wherein determining that the respective one or more perturbation parameters for the layer do not satisfy the constraint based on the perturbation radius threshold comprises: generating a first magnitude for the one or more perturbation parameters for the layer; generating a second magnitude for the respective one or more corruption neural network parameters for the layer; generating a ratio between the first magnitude and the second magnitude; and determining that the ratio does not satisfy the constraint based on the perturbation radius threshold.

Embodiment 6 is the method of Embodiment 5, wherein the respective coefficient is generated based on the ratio.

Embodiment 7 is the method of any one of Embodiments 1-6, wherein updating the plurality of perturbation parameters of the corruption neural network using the first objective function comprises: determining a gradient of the first objective function with respect to the plurality of perturbation parameters for the training network input; and updating, based on the gradient and the plurality of perturbation parameters, the plurality of perturbation parameters for the training network input.

Embodiment 8 is the method of any one of Embodiments 1-7, wherein the plurality of corruption neural network parameters are static during the training of the first neural network.

Embodiment 9 is the method of any one of Embodiments 1-8, wherein the corruption neural network has been pre-trained with the plurality of perturbation parameters being set to respective values that do not impact inference operations of the corruption neural network.

Embodiment 10 is the method of any one of Embodiments 1-9, wherein the corruption neural network comprises one or more network layers, wherein each layer of the one or more network layers has respective one or more corruption neural network parameters of the plurality of corruption neural network parameters and respective one or more perturbation parameters of the plurality of perturbation parameters, wherein for processing an input to at least one network layer of the one or more network layers, the method further comprises: determining, for the at least one network layer, respective one or more corrupted network parameters for the at least one network layer based on the respective one or more corruption neural network parameters and the respective one or more perturbation parameters; and processing, using the determined respective one or more corrupted network parameters, the input to the at least one network layer.

Embodiment 11 is the method of any one of Embodiments 1-10, wherein after generating, for each training example of the set of training examples using the corruption neural network with the updated perturbation parameters, the respective updated corrupted network input for the training network input, the method further comprises: for each of the respective updated corrupted network inputs, determining a similarity measure between the network input and the respective updated corrupted network input; determining that the similarity measure does not satisfy a threshold similarity measure; in response to determining that the similarity measure does not satisfy the threshold similarity measure, further updating the respective updated corrupted network input based on an interpolation weight to satisfy the threshold similarity measure.

Embodiment 12 is the method of Embodiment 11, the method of claim 11, wherein the similarity measure is a structural similarity index measure ("SSIM").

Embodiment 13 is the method of Embodiment 11, wherein determining the interpolation weight comprises: generating a plurality of candidate interpolation weights; for each candidate interpolation weight of the candidate interpolation weights: generating a candidate corrupted network input from the respective updated corrupted network input using the candidate interpolation; determining a respective similarity measure between the network input and the candidate corrupted network input; generating a polynomial based on the respective similarity measures and the threshold similarity measure; determining roots to the polynomial, and selecting, as the interpolation weight, a root from the roots to the polynomial.

Embodiment 14 is the method of any one of Embodiments 1-13, wherein the network output comprises a score distribution over a set of object classes, wherein each score in the score distribution represents a predicted likelihood that the network input represents an object from a corresponding object class from the set of object classes.

Embodiment 15 is a system comprising one or more computers and one or more storage devices storing instructions that are operable, when executed by the one or more computers, to cause the one or more computers to perform the method of any one of embodiments 1 to 14.

Embodiment 16 is a computer storage medium encoded with a computer program, the program comprising instructions that are operable, when executed by data processing apparatus, to cause the data processing apparatus to perform the method of any one of embodiments 1 to 14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
 receiving a network input; and
 processing the network input using a first neural network to generate an output for a machine learning task, wherein the first neural network comprises a plurality of first neural network parameters and has been trained on training examples, the training comprising:
  receiving the training examples for training the first neural network, wherein each training example comprises a training network input and a reference output;
  for each training iteration in a set of training iterations:
   generating, for each training example of a set of the training examples and using a corruption neural network, a respective corrupted network input for the training network input in the training example, wherein the corruption neural network has a plurality of corruption neural network parameters and a plurality of perturbation parameters;
   updating, based on the respective corrupted network inputs, the plurality of perturbation parameters of the corruption neural network using a first objective function;
   generating, for each training example of the set of training examples and using the corruption neural network with the updated perturbation parameters, a respective updated corrupted network input for the training network input in the training example; and
   generating, by processing the respective updated corrupted network inputs using at least the first neural network, corresponding respective network outputs; and
  for each training example in the set of training examples, based on (i) the corresponding respective network output for the respective updated corrupted network input and (ii) the reference output in the training example, updating the plurality of first neural network parameters using a second objective function.

2. The method of claim 1, wherein updating the plurality of perturbation parameters of the corruption neural network using the first objective function comprises updating the plurality of perturbation parameters while constraining the plurality of perturbation parameters to satisfy a constraint based on a perturbation radius threshold.

3. The method of claim 2, wherein updating the plurality of perturbation parameters of the corruption neural network comprises repeatedly updating the plurality of perturbation parameters for a plurality of iterations, wherein for each iteration of the plurality of iterations:
 generating, using the corruption neural network, a respective corrupted network input for each training network input in the set of training examples for the iteration; and
 updating, based on the respective corrupted network inputs for the iteration, the plurality of perturbation parameters of the corruption neural network by optimizing the first objective function.

4. The method of claim 3, wherein the corruption neural network comprises one or more network layers, wherein each layer of the one or more network layers has respective one or more corruption neural network parameters of the plurality of corruption neural network parameters and respective one or more perturbation parameters of the plurality of perturbation parameters, wherein constraining the plurality of perturbation parameters to satisfy the constraint based on the perturbation radius threshold comprises:
 for each iteration of the plurality of iterations:
  determining, for each layer of the one or more network layers, that the respective one or more perturbation parameters for the layer do not satisfy the constraint based on the perturbation radius threshold;
  generating a respective coefficient for the respective one or more perturbation parameters; and further updating, using the respective coefficient, the respective one or more perturbation parameters of the layer.

5. The method of claim 4, wherein determining that the respective one or more perturbation parameters for the layer do not satisfy the constraint based on the perturbation radius threshold comprises:
generating a first magnitude for the one or more perturbation parameters for the layer;
generating a second magnitude for the respective one or more corruption neural network parameters for the layer;
generating a ratio between the first magnitude and the second magnitude; and
determining that the ratio does not satisfy the constraint based on the perturbation radius threshold.

6. The method of claim 5, wherein the respective coefficient is generated based on the ratio.

7. The method of claim 1, wherein updating the plurality of perturbation parameters of the corruption neural network using the first objective function comprises:
determining a gradient of the first objective function with respect to the plurality of perturbation parameters for the training network input; and
updating, based on the gradient and the plurality of perturbation parameters, the plurality of perturbation parameters for the training network input.

8. The method of claim 1, wherein the plurality of corruption neural network parameters are static during the training of the first neural network.

9. The method of claim 1, wherein the corruption neural network has been pre-trained with the plurality of perturbation parameters being set to respective values that do not impact inference operations of the corruption neural network.

10. The method of claim 1, wherein the corruption neural network comprises one or more network layers, wherein each layer of the one or more network layers has respective one or more corruption neural network parameters of the plurality of corruption neural network parameters and respective one or more perturbation parameters of the plurality of perturbation parameters, wherein for processing an input to at least one network layer of the one or more network layers, the method further comprises:
determining, for the at least one network layer, respective one or more corrupted network parameters for the at least one network layer based on the respective one or more corruption neural network parameters and the respective one or more perturbation parameters; and
processing, using the determined respective one or more corrupted network parameters, the input to the at least one network layer.

11. The method of claim 1, wherein after generating, for each training example of the set of training examples and using the corruption neural network with the updated perturbation parameters, the respective updated corrupted network input for the training network input, the method further comprises:
for each of the respective updated corrupted network inputs, determining a similarity measure between the network input and the respective updated corrupted network input;
determining that the similarity measure does not satisfy a threshold similarity measure; and
in response to determining that the similarity measure does not satisfy the threshold similarity measure, further updating the respective updated corrupted network input based on an interpolation weight to satisfy the threshold similarity measure.

12. The method of claim 11, wherein the similarity measure is a structural similarity index measure ("SSIM").

13. The method of claim 11, further comprising determining the interpolation weight, wherein determining the interpolation weight comprises:
generating a plurality of candidate interpolation weights;
for each candidate interpolation weight of the candidate interpolation weights:
generating a candidate corrupted network input from the respective updated corrupted network input using the candidate interpolation;
determining a respective similarity measure between the network input and the candidate corrupted network input;
generating a polynomial based on the respective similarity measures and the threshold similarity measure;
determining roots to the polynomial; and
selecting, as the interpolation weight, a root from the roots to the polynomial.

14. The method of claim 1, wherein the output for the machine learning task comprises a score distribution over a set of object classes, wherein each score in the score distribution represents a predicted likelihood that the network input represents an object from a corresponding object class from the set of object classes.

15. A system comprising one or more computers and one or more storage devices storing instructions that, when executed by the one or more computers, cause the one or more computers to perform operations, the operations comprising:
receiving a network input; and
processing the network input using a first neural network to generate an output for a machine learning task, wherein the first neural network comprises a plurality of first neural network parameters and has been trained on training examples, the training comprising:
receiving the training examples for training the first neural network, wherein each training example comprises a training network input and a reference output;
for each training iteration in a set of training iterations:
generating, for each training example of a set of the training examples and using a corruption neural network, a respective corrupted network input for the training network input in the training example, wherein the corruption neural network has a plurality of corruption neural network parameters and a plurality of perturbation parameters;
updating, based on the respective corrupted network inputs, the plurality of perturbation parameters of the corruption neural network using a first objective function;
generating, for each training example of the set of training examples and using the corruption neural network with the updated perturbation parameters, a respective updated corrupted network input for the training network input in the training example; and
generating, by processing the respective updated corrupted network inputs using at least the first neural network, corresponding respective network outputs; and
for each training example in the set of training examples, based on (i) the corresponding respective network output for the respective updated corrupted network input and (ii) the reference output in the training example, updating the plurality of first neural network parameters using a second objective function.

16. The system of claim 15, wherein updating the plurality of perturbation parameters of the corruption neural network using the first objective function comprises updating the plurality of perturbation parameters while constraining the plurality of perturbation parameters to satisfy a constraint based on a perturbation radius threshold.

17. The system of claim 16, wherein updating the plurality of perturbation parameters of the corruption neural network comprises repeatedly updating the plurality of perturbation parameters for a plurality of iterations, wherein for each iteration of the plurality of iterations:
generating, using the corruption neural network, a respective corrupted network input for each training network input in the set of training examples for the iteration; and
updating, based on the respective corrupted network inputs for the iteration, the plurality of perturbation parameters of the corruption neural network by optimizing the first objective function.

18. One or more non-transitory computer storage media storing instructions that, when executed by one or more computers, cause the one or more computers to perform operations, the operations comprising:
receiving a network input; and
processing the network input using a first neural network to generate an output for a machine learning task, wherein the first neural network comprises a plurality of first neural network parameters and has been trained on training examples, the training comprising:
receiving the training examples for training the first neural network, wherein each training example comprises a training network input and a reference output;
for each training iteration in a set of training iterations:
generating, for each training example of a set of the training examples and using a corruption neural network, a respective corrupted network input for the training network input in the training example, wherein the corruption neural network has a plurality of corruption neural network parameters and a plurality of perturbation parameters;
updating, based on the respective corrupted network inputs, the plurality of perturbation parameters of the corruption neural network using a first objective function;
generating, for each training example of the set of training examples and using the corruption neural network with the updated perturbation parameters, a respective updated corrupted network input for the training network input in the training example; and
generating, by processing the respective updated corrupted network inputs using at least the first neural network, corresponding respective network outputs; and
for each training example in the set of training examples, based on (i) the corresponding respective network output for the respective updated corrupted network input and (ii) the reference output in the training example, updating the plurality of first neural network parameters using a second objective function.

19. The one or more non-transitory computer storage media of claim 18, wherein updating the plurality of perturbation parameters of the corruption neural network using the first objective function comprises updating the plurality of perturbation parameters while constraining the plurality of perturbation parameters to satisfy a constraint based on a perturbation radius threshold.

20. The one or more non-transitory computer storage media of claim 19, wherein updating the plurality of perturbation parameters of the corruption neural network comprises repeatedly updating the plurality of perturbation parameters for a plurality of iterations, wherein for each iteration of the plurality of iterations:
generating, using the corruption neural network, a respective corrupted network input for each training network input in the set of training examples for the iteration; and
updating, based on the respective corrupted network inputs for the iteration, the plurality of perturbation parameters of the corruption neural network by optimizing the first objective function.

\* \* \* \* \*